United States Patent Office 3,728,133
Patented Apr. 17, 1973

3,728,133
FOAMED MAYONNAISE COMPOSITION
Max E. Norris, Parma, Ohio, assignor to
SCM Corporation, Cleveland, Ohio
No Drawing. Filed Aug. 11, 1971, Ser. No. 171,009
Int. Cl. A23l 1/24
U.S. Cl. 99—144                 16 Claims

ABSTRACT OF THE DISCLOSURE

A mayonnaise composition having a specific gravity of from 0.35–0.7 gm./cm.$^3$ comprising water, vinegar, egg yolk, spices, and an emulsifier comprising in combination a hydroxy acid ester of a glyceride and a monoglyceride is set forth.

Mayonnaise compositions are widely known and have been used extensively by the homemaker as a seasoning and for making food products such as souffle type salads, toppings, tartar-like sauces for fish, fruit salad, and canapés.

Mayonnaise compositions typically comprise oil, water, emulsifier, egg yolk, vinegar, and spices, the oil-to-water ratio being high; i.e., from about 3:1 to 8:1 by weight. When blended together, the oil, water, and other ingredients form a homogeneous emulsion having a specific gravity of about 0.9 gram per cubic centimeter (gm./cm.$^3$). To keep the emulsion stable, it has become more or less standard in the mayonnaise field to use egg yolk as the emulsifying agent, although other emulsifiers such as lecithin, propylene glycol esters of alginic acid, and vegetable gums have been used in combination with egg yolk.

Mayonnaise compositions, to my knowledge, have not been foamed; i.e., aerated primarily because there is no known way of foaming and producing a stable emulsion with mayonnaise. Part of the reason for this difficulty and inability to whip or aerate mayonnaise is caused by the high oil-to-water ratio in the composition and partly because improper emulsifier combinations have been employed heretofore in making mayonnaise.

An aspect of the invention is a mayonnaise composition which is foamed to a relatively low specific gravity; i.e., 0.35–0.7 gm./cm.$^3$. Another aspect is that the mayonnaise composition having a low specific gravity has excellent emulsion stability after foaming.

Advantages of a "foamed mayonnaise" product with a specific gravity of about 0.35–0.7 gm./cm.$^3$ is that the composition, of course, has a "light, fluffy" appearance which can be desirable for decorating food products. Another advantage is that it often reduces the amount of mayonnaise required to provide a canopy for fruit salad and other food products; thus, cost can often be reduced. A third advantage is that the foamed mayonnaise can be applied by spreading with little difficulty, whereas commercial mayonnaise can be somewhat more difficult to apply.

It has been found that a foamed mayonnaise having a specific gravity of about 0.35–0.7 gm./cm.$^3$ comprising oil, water, vinegar, egg yolk, and spices can be prepared by incorporating therein as a portion of the emulsifier in combination, a hydroxy fatty acid ester of a partial glyceride and a monoglyceride, the ratio of hydroxy fatty acid ester a partial glyceride to monoglyceride being from about 5:1 to 1:1 by weight.

By a "hydroxy fatty acid ester of a partial glyceride," it is meant to refer to a glyceride wherein at least one of the hydroxyl groups is acylated by a hydroxy acid.

Several methods known to those skilled in the art can be used in preparing the hydroxy esters of a partial glyceride. One of the preferred methods is to react glycerin or a partial glyceride with a hydroxy fatty acid ester in an ester interchange. Another route for preparing the hydroxy esters is by direct esterification, wherein the hydroxy acid itself is reacted with glycerin or a partial glyceride. The preparation of lactylated glycerol esters which can be used in preparing the mayonnaise composition are shown in Paders, U.S. patent, 3,248,229 and such processes are hereby incorporated by reference.

The hydroxy fatty acid ester of a partial glyceride can be a triglyceride or diglyceride with one or more of the hydroxyl groups being acylated with the hydroxy fatty acid. The other one or two hydroxyl groups may be acylated with either a fatty acid or another hydroxy fatty acid. Additionally, one of the hydroxyl groups usually the interior hydroxyl group, may be in its unreacted form, as a partial glyceride is also acceptable.

Preferred examples of the hydroxy acid esters of a glyceride are glycerol lacto palmitate, glycerol lacto stearate, and glycerol lacto oleate. The hydroxy acids for making the esters and supplying the hydroxy acid portion are aliphatic mono-basic hydroxy acids having from 4–8 carbon atoms in the structure. These acids include: lactic, tartaric, citric, hydroxy butyric, and so forth. For reasons of efficiency and economy, the preferred hydroxy fatty acid or ester used in making the hydroxy fatty acid ester of a partial glyceride is lactic.

By a "monoglyceride composition," it is meant to refer to a partial glyceride composition containing at least 30% monoglyceride, and preferably above 40% by weight. Generally, a monoglyceride is sold or employed in the form of a mono-diglyceride composition, wherein the composition contains from about 40–45% of a monoglyceride, 40–45% of a diglyceride, and the balance being triglyceride. Distilled monogycerides can also be used and differ only from the mono-diglyceride above in that their alpha-monoglyceride content is higher due to refining procedures.

The fatty acid portion of the monoglyceride or monodiglyceride can be derived from those aliphatic fatty acids having from 10–22 carbon atoms in the structure. Examples of fatty acids include: oleic, palmitic, stearic, lauric, myristic, behenic, linoleic, linolenic, palmitoleic, arachidonic, and so forth. For efficiency and economy, the preferred fatty acid used in preparing a monoglyceride is oleic, palmitic, or stearic, and preferably, the latter.

The combination of the emulsifying ingredients used in formulating the salad dressing composition should be in a proportion of about 5:1 to 1:1 by weight, that is with respect to the hydroxy fatty acid ester of a glyceride to monoglyceride. When the proportion of hydroxy fatty acid ester of glyceride to monoglyceride exceeds about 5:1, instability of the foamed salad dressing or mayonnaise often results or at least the stability is inferior to that obtained when the emulsifier combination is within this range. Then too, when the hydroxy fatty acid ester of the monoglyceride falls below about 1:1 inferior results as compared to those obtained with an emulsifier combination within this range are noted.

The combination emulsifier comprising the hydroxy acid ester of a glyceride and a monoglyceride is included at least as a portion of the total emulsifier in the mayonnaise composition. By a "portion," it is meant that it is included in a proportion of at least about 2–8% by weight of the oil used in making the mayonnaise composition. Preferably, the emulsifier combination is included in a proportion of from about 3–6% by weight of the oil as higher levels of emulsifier tend to impart a soapy-emulsifier like taste to the mayonnaise composition. On the other hand, emulsion stability tends to become undesirable at lower levels.

Other emulsifiers commonly used in making mayonnaise compositions can be used in combination with the egg yolk and emulsifier combination. Levels of incorporation of these emulsifiers can be those commonly used in preparing mayonnaise compositions and often do not exceed 0.5–1% by weight of the fat or oil. Such emulsifiers include the propylene glycol esters, such as propylene glycol monostearate, propylene glycol mono-oleate, and so forth. Additionally, ethoxylated esters of polyhydric alcohols; e.g., an ethoxylated polyoxyethylene sorbitol monostearate are used.

Oils useful for preparing the mayonnaise compositions can be any of those used for making a conventional mayonnaise. Among the suitable oils are the so-called salad oils, such as olive oil, sun flower oil, safflower oil, sesame oil, and so forth. Other oils, such as cottonseed oil and corn oil can be used; however, it is common practice to dewax the oils prior to making the mayonnaise composition.

The mayonnaise composition of this invention can also include a variety of spices, such as salt, mustard, garlic, paprika, sugar, pepper, and others conventionally used in making mayonnaise. Additionally, thickeners such as the vegetable gums; e.g., guar gum and celluloses, such as carboxy methyl cellulose and sodium carboxy methyl cellulose, and so forth can be used where desired. Natural or synthetic sweetening agents are used in amounts as desired. Such sweetening agents typically are sucrose, dextrose, lactose, corn syrup, and so forth.

The following examples are provided to illustrate the preferred embodiments of the invention, and are not intended to restrict the scope thereof. All parts are parts by weight, and all percentages are weight percentages.

EXAMPLE I

A mayonnaise composition is formulated and prepared with the following ingredients:

TABLE I

| Ingredients: | Parts |
| --- | --- |
| Soya salad oil (containing 6% of a substantially equal portion of glycerol lacto palmitate and glycerol lacto stearate, and 2% of a mono-diglyceride containing about 40–45% α-monoglyceride, and 40–45% diglyceride) | 65 |
| Vinegar (diluted with water in a 1:1 ratio) | 20.5 |
| Egg yolk | 10 |
| Salt | 2 |
| Sugar | 2 |
| Mustard | 0.5 |

In preparing the soya salad oil containing the emulsifier combination, the salad oil is heated to a temperature of 150° F. and the emulsifier combination of glycerol lacto palmitate-glycerol lacto stearate, and mono-diglyceride is added to the heated salad oil. The temperature is maintained until the components are substantially melted together. Then the heated product is passed through a heat exchanger and the temperature reduced to about 70° F. Then the cooled product is passed to a tank and mixed for about 24–48 hours.

A portion of the oil (about 40%) is added to the egg yolk and seasoning and whipped in a mixer until thoroughly blended. Then a portion (about 40%) of the vinegar-water mixture is added to the blend and the resultant mixture is again whipped in a mixer until the ingredients are emulsified. The remaining ingredients; i.e., oil, vinegar-water are added to the mixture and blended for about 5 minutes until the oil-water phases and other condiments are completely emulsified.

The ability of the mayonnaise composition to aerate is determined by mixing samples of substantially equal proportion for a period of time of from 3, 5, 7, and 9 minutes respectively with a household mixer. The specific gravity and stability of the mayonnaise composition for mixing times of from 0–9 minutes is as follows:

TABLE II

| Mixing time (minutes) | Specific gravity (gm./cm.$^3$) | Stability |
| --- | --- | --- |
| 0 | 0.92 | Stable. |
| 3 | 0.45 | Do. |
| 5 | 0.39 | Do. |
| 7 | 0.31 | Coalescence. |
| 9 | 0.29 | Do. |

Coalescence and emulsion breakdown resulted at the 7 and 9-minute whipping times, indicating that a specific gravity of below about 0.35 results in a product having insufficient strength to maintain a foamed state. This probably is caused by temperature build-up in the composition resulting from such blending and partly because there is insufficient body in the resultant emulsion to maintain stability. The results also show that the mayonnaise has good stability at a specific gravity of about 0.35–0.45 gm./cm.$^3$. A preferred range has been found to be between about 0.45–0.55 gm./cm.$^3$.

EXAMPLE II

A commercial mayonnaise product prepared according to the mayonnaise of Example I and comprises the following ingredients:

TABLE III

| Ingredients: | Parts |
| --- | --- |
| Soya salad oil | 65 |
| Vinegar (diluted w/water in a 1:1 ratio) | 20.5 |
| Egg yolk | 10 |
| Salt | 2 |
| Sugar | 2 |
| Mustard | 0.5 |

The mayonnaise then was tested in an identical manner to that of the mayonnaise composition of Example I. The results of such tests are as follows:

TABLE IV

| Mixing time (minutes) | Specific gravity (gm./cm.$^3$) | Stability |
| --- | --- | --- |
| 0 | 0.92 | Stable. |
| 3 | 0.90 | Do. |
| 5 | 0.89 | Do. |
| 7 | 0.92 | Nonstable (emulsion broken). |
| 9 | 0.98 | Do. |

The above table shows that after a 3 and 5-minute period of mixing, very little aeration of the mayonnaise results, as the specific gravity remains substantially constant. After a period of 7 minutes, it is also noted that although the specific gravity of the mayonnaise did not decrease, the emulsion broke. The emulsion breakdown probably was caused by temperature build-up in the composition due to the work input from the mixer.

A second mayonnaise composition employing the same formula as the commercial mayonnaise composition except that the soya salad oil contained 4% by weight of triglycerol monostearate as the emulsifier. The mayonnaise composition was prepared and tested in an identical manner to that of Example I. It was noted that the mayonnaise composition did not aerate.

What is claimed is:

1. A mayonnaise composition containing oil, vinegar, egg yolk, water, and spices having a specific gravity of 0.35–0.7 gm./cm.$^3$ which comprises at least about 2–8% by weight of the oil of an emulsifier combination of a hydroxy fatty acid ester of a glyceride and a monoglyceride.

2. The composition of claim 1, wherein the ratio of said hydroxy fatty acid ester of a glyceride to monoglyceride is from about 5:1 to 1:1 by weight, and said emulsifier combination is included in a proportion of from 3–6% by weight of the oil.

3. The composition of claim 2, wherein said combination comprises substantially all of the emulsifier employed.

4. The composition of claim 2, wherein said hydroxy fatty acid ester of a glyceride is a lactic acid ester.

5. The composition of claim 4, wherein said fatty acid portion of said monoglyceride is derived from a fatty acid having from 10–22 carbon atoms.

6. The composition of claim 5, wherein said lactic acid derivative is substantially glycerol lacto palmitate.

7. The composition of claim 5, wherein said lactic acid ester is substantially glycerol lacto stearate.

8. The compostion of claim 5, wherein said lactic acid derivative is substantially glycerol lacto oleate.

9. In a process for producing a mayonnaise composition containing oil, vinegar, water, and spices, the improvement of foaming said mayonnaise to a specific gravity of from about 0.35–0.7 gm./cm.$^3$ which comprises including at least about 2–8% by weight of the oil of said composition, an emulsifier combination of a hydroxy fatty acid ester of a glyceride and a monoglyceride, and thereafter whipping said mayonnaise composition.

10. The process of claim 9, wherein the ratio of said hydroxy fatty acid ester of a glyceride to monoglyceride is from about 5:1 to 1:1 by weight, and said emulsifier combination is included in a proportion of from 3–6% by weight of the oil.

11. The process of claim 10, wherein said combination comprises substantally all of said emulsifier.

12. The process of claim 10, wherein said hydroxy fatty acid ester of a glyceride is a lactic acid ester.

13. The process of claim 12, wherein said fatty acid portion of said monoglyceride is derived from a fatty acid having from 10–22 carbon atoms.

14. The process of claim 13, wherein said lactic acid derivative is substantially glycerol lacto palmitate.

15. The process of claim 13, wherein said lactic acid ester is substantially glycerol lacto stearate.

16. The process of claim 13, wherein said lactic acid derivative is substantially glycerol lacto oleate.

References Cited

UNITED STATES PATENTS

| | | | |
|---|---|---|---|
| 2,844,469 | 7/1958 | Melnick | 99—144 |
| 3,230,091 | 1/1966 | Thompson | 99—139 |

ALVIN E. TANENHOLTZ, Primary Examiner

J. M. HUNTER, Assistant Examiner